US008778213B2

(12) United States Patent
Guo et al.

(10) Patent No.: US 8,778,213 B2
(45) Date of Patent: Jul. 15, 2014

(54) FERROCENE-BASED FIRE EXTINGUISHING COMPOSITION

(75) Inventors: Hongbao Guo, Xi'an (CN); Honghong Liu, Xi'an (CN)

(73) Assignee: Xi'An J&R Fire Fighting Equipment Co., Ltd., Xi'an, Shaanxi (CN)

( * ) Notice: Subject to any disclaimer, the term of this patent is extended or adjusted under 35 U.S.C. 154(b) by 0 days.

(21) Appl. No.: 13/824,124

(22) PCT Filed: Sep. 7, 2011

(86) PCT No.: PCT/CN2011/079426

§ 371 (c)(1),
(2), (4) Date: Mar. 15, 2013

(87) PCT Pub. No.: WO2012/034492

PCT Pub. Date: Mar. 22, 2012

(65) Prior Publication Data

US 2013/0221264 A1 Aug. 29, 2013

(30) Foreign Application Priority Data

Sep. 16, 2010 (CN) .......................... 2010 1 0285564

(51) Int. Cl.
*A62D 1/06* (2006.01)
*C09K 21/00* (2006.01)

(52) U.S. Cl.
USPC ............ 252/5; 252/4; 252/6; 252/7; 252/605; 169/44; 169/45; 169/46; 169/47

(58) Field of Classification Search
USPC ............ 252/4, 5, 6, 7, 605, 606, 610; 169/44, 169/45, 46, 47
See application file for complete search history.

(56) References Cited

U.S. PATENT DOCUMENTS 3,269,963 A * 8/1966 Ilgemann et al. ............. 521/146
5,532,292 A * 7/1996 Wainwright et al. ......... 523/179
5,948,323 A * 9/1999 McLaughlin et al. ........ 252/610
6,217,788 B1 * 4/2001 Wucherer et al. ................. 252/5
6,328,906 B1 * 12/2001 Lundstrom et al. ............... 252/5
8,465,833 B2 * 6/2013 Lee et al. ...................... 428/323
2002/0121622 A1 9/2002 Rusin et al.
2007/0007019 A1 * 1/2007 Wierenga et al. ............... 169/30
2013/0052452 A1 * 2/2013 Lee et al. ...................... 428/323
2013/0168593 A1 * 7/2013 Guo et al. .......................... 252/2
2013/0175060 A1 * 7/2013 Guo et al. ........................ 169/46
2013/0181157 A1 * 7/2013 Guo et al. .......................... 252/2
2013/0181158 A1 * 7/2013 Guo et al. .......................... 252/2

FOREIGN PATENT DOCUMENTS

CN 1238226 A 12/1999
CN 1481266 A 3/2004
CN 1713935 A 12/2005
CN 101327364 A 12/2008
CN 201260858 Y 6/2009
CN 101822883 A 9/2010

OTHER PUBLICATIONS

Security Analysis of Gas Fire Extinguishing System (Fire Protection Science and Technology 2002 21 (5)).
Proceedings of the Combustion Institute, vol. 28, 2000/pp. 965-2972.
Study of Characteristics of Heat Release Rate of Pool Fire under Action of Ferrocene, Journal of Henan Polytechnic University, 2008, vol. 27, No. 6.
Study of Characteristics of the Extinguishment of Alcohol Fire, Journal of China University of Mining Technology, 2008, vol. 37, No. 2.
Analysis of Effectiveness of Gas-phase Ferrocene in Suppressing Pool Fire, Journal of Safety and Environment, 2008, vol. 8, No. 2.
Experimental Research of Gas-phase Ferrocene in Suppressing Alcohol Pool Fire, Thermal Science and Technology, 2007, vol. 6, No. 3.
Development of a Ferrocene Fire extinguishing Experimental Platform and Experimental Study on Fire extinguishing Effectiveness, Fire Science, 2007, vol. 16, No. 2.
Flame inhibiton by ferrocene, alone and with $CO_2$ and $CF_3H$; G.T. Linteris, M.D. Rumrninger, and V. Babushok; National Institute of Standards & Technology (May 2000).

* cited by examiner

*Primary Examiner* — Joseph D Anthony
(74) *Attorney, Agent, or Firm* — Muncy, Geissler, Olds & Lowe, P.C.

(57) ABSTRACT

The present invention relates to a ferrocene-based fire extinguishing composition. The ferrocene-based fire extinguishing composition comprises ferrocene, a ferrocene derivative, or a combination thereof at a content of 25 mass % or more; when in use, a pyrotechnic agent is used as a heat source and a power source, the pyrotechnic agent is ignited, and the high temperature generated by the combustion of the pyrotechnic agent is utilized to make a fire extinguishing composition produce a large amount of fire extinguishing substance, which is sprayed out together with the pyrotechnic agent, so as to achieve the purpose of extinguishing a fire. Compared with a conventional fire extinguishing composition, a more efficient and safer fire extinguishing composition is provided.

29 Claims, No Drawings

FERROCENE-BASED FIRE EXTINGUISHING COMPOSITION

This application is a national stage of International Application No.: PCT/CN2011/079426, which was filed on Sep. 7, 2011, and which claims priority to CN201010285564.6, which was filed on Sep. 16, 2010, and which are both herein incorporated by reference.

TECHNICAL FIELD

The present invention belongs to the field of fire protection, and relates to a novel and efficient fire extinguishing composition, and more concretely to a ferrocene-based fire extinguishing composition using ferrocene and its derivatives as the main fire extinguishing materials.

BACKGROUND ART

Since Canada Montreal Protocol (1987) presented a specific objective to replace halon fire extinguishing agent, countries around the world are committed to the research of new fire extinguishing technology. The direction of people's efforts is to acquire a fire extinguishing technology that has a high fire extinguishing efficiency and is free of contamination to the environment.

As being environment friendly, gas extinguishing systems, dry powder extinguishing systems and water-based extinguishing systems have been widely used as alternatives for halon fire extinguishing agent. Extinguishing systems of inert gases such as carbon dioxide, IG541, etc. physically extinguish fire due to suffocation by lowering the oxygen concentration of firing area. This fire extinguishing mode easily poses a threat to the personal safety. The dry powder tire extinguishing system ejects powder under a pressurized gas so that the powder contacts with the flame and extinguishes the flame due to physical and chemical inhibition action. Water spraying fire extinguishing system plays a triple role, cooling, suffocation and isolating thermal radiation by water mist, to control fires, suppress fires and extinguish fires.

However, all of these fire extinguishing systems require high pressure storage in addition to large volume, so there is a risk of physical explosion during storage. A document "Security Analysis of Gas Fire Extinguishing System" (Fire Protection Science and Technology 2002 21 (5)) gives analysis of risks existing in the gas fire extinguishing system and lists security accidents triggered by the use of the stored pressure gas extinguishing system.

Data shows that foreign research institutions have conducted much research to look for fire extinguishing substances. The next generation of fire extinguishing technology project team (NGP) of the Building and Fire Research Centre of National Institute of Standards and Technology of America has done much experimental research work in finding novel fire extinguishing substances in replacement for halon. In the study, they found that ferrocene was a fire extinguishing substance with very strong fire extinguishing capability. Ferrocene was heated with high temperature nitrogen, carbon dioxide, or $CF_3H$ as a carrier gas and was sublimated to gas. Fire extinguishing test was carried out by applying the carrier gas together with the ferrocene vapor on a flame. It was found that addition of ferrocene can significantly reduce the extinguishing concentration of the carrier gas, thus proving that ferrocene has a very strong flame suppressing capability (Halon Options Technical Working Conference 2-4 May 2000, Flame Inhibition by ferrocene, alone and with $CO_2$ and $CF_3H$; Proceedings of the Combustion Institute, Volume 28, 2000/pp 965-2972, Flame inhibition by ferrocene and blends of inert and catalytic agents; Flame inhibition by ferrocene, Carbon Dioxide, and Trifluotomethane Blends Synergistic and Antagonistic Effects).

Henan Polytechnic University has also conducted research on ferrocene flame suppression and published relevant articles, such as Study of Characteristics of Heat Release Rate of Pool Fire under Action of Ferrocene, Journal of Henan Polytechnic University, 2008, Vol. 27, No. 6, Study of Characteristics of the Extinguishment of Alcohol Fire, Journal of China University of Mining Technology; 2008, Vol. 37, No. 2, Analysis of Effectiveness of Gas-phase Ferrocene in Suppressing Pool Fire, Journal of Safety and Environment, 2008, Vol. 8, No. 2, Experimental Research of Gas-phase Ferrocene in Suppressing Alcohol Pool Fire, Thermal Science and Technology, 2007, Vol. 6, No. 3, Development of a Ferrocene Fire extinguishing Experimental Platform and Experimental Study on Fire extinguishing Effectiveness, Fire Science, 2007, Vol. 16, No. 2. Further, a patent CN101327364A discloses a ferrocene fire extinguishing experiment system.

However, these studies on the extinguishing performance of ferrocene were only built on the basis of laboratory research but not put into practical application. Though a patent CN 1238226A discloses a novel aerosol fire extinguishing agent in which ferrocene is employed in the formulation of the aerosol fire extinguishing agent, ferrocene is used as a catalyst, and its flame-inhibition property is not used.

Existing aerosol fire extinguishing agents mainly include S-type and K-type fire extinguishing agents. In view of a comprehensive analysis of their performance characteristics, aerosol fire extinguishing agents mainly have the following shortcomings: owing to the occurrence of redox reaction of the fire extinguishing agent, a large quantity of gas and active particles are generated, and thereby aerosol fire extinguishing agents achieve the purpose of fire extinguishing by means of the combination of chemical and physical methods through the chain scission reaction of the active particles and coverage and suffocation by the large quantity of gas. The aerosol fire extinguishing agent undergoes combustion reaction and releases a large quantity of heat whiling releasing aerosol. Thus, it is necessary to add a cooling system to effectively decrease the temperature of the device and the aerosol and to avoid secondary fires. As a result, the device structure is complex and bulky, and the process is complicated and has a high cost. Moreover, lots of active particles lose activity due to the presence of the cooling system, resulting in greatly reduced extinguishing performance.

SUMMARY OF THE INVENTION

Considering the status of the existing fire extinguishing devices, especially the inherent flaws of the aerosol fire extinguishing agent, the object of the invention is to provide a ferrocene-based fire extinguishing composition that does not need pressure storage and is safer and more environmental and efficient.

The ferrocene-based fire extinguishing composition of the present invention comprises ferrocene, ferrocene derivatives, or a combination thereof, at a content of 25 mass % or more.

In addition to ferrocene or ferrocene derivatives as the main fire extinguishing material, a variety of flame retardants, additives, etc. commonly used in the art can be suitably added to the ferrocene-based fire extinguishing composition of the present invention.

The ferrocene-based fire extinguishing composition of the present invention can simultaneously achieve the following effects. First, the ferrocene-based fire extinguishing composition when being heated instantly releases a large quantity of effective fire extinguishing substance, which is mainly in form of liquid or solid particles. By virtue of a synergistic effect of a variety of microparticles, the time for fire extinguishment is greatly reduced. Second, the flame retardant effect of the decomposition product further enhances the fire extinguishing effectiveness of the fire extinguishing agent while reducing the possibility of rekindling of the combustion source. Third, the ferrocene-based fire extinguishing composition being heated at a high temperature can rapidly undergo endothermic decomposition, thereby effectively and quickly reducing the heat released by the combustion of a pyrotechnic agent and greatly reducing the temperature of the nozzle of the fire extinguisher and the substance sprayed out. Therefore, the complicated cooling system of the fire extinguishing device is eliminated, and the risk of secondary fires is also eliminated. Fourth, the fire extinguishing composition can be easily processed and molded, and it can be used alone or be used in combination with a physical coolant. Fifth, it has a stable performance and is easy to a long-term storage. Sixth, it has low toxicity or is nontoxic, and it is environment friendly and has good performance.

Hereinafter, the ferrocene-based fire extinguishing composition of the present invention is described in more detail.

The ferrocene-based fire extinguishing composition of the present invention comprises ferrocene, ferrocene derivatives, or a combination thereof at a content of 25 mass % or more.

It has been disclosed in the prior art that ferrocene is added in the fire extinguishing composition. However, it is added as an additive, and the addition amount is very small, about 5 mass % or less. Through a large number of experiments, the present inventors have found that when ferrocene or ferrocene derivatives are used as the main fire extinguishing material (at a content of 25 mass % or more), an excellent extinguishing effect can be achieved, and it is environment friendly.

Flame inhibition mechanism of ferrocene or ferrocene derivatives is as follows: gas-phase ferrocene or its derivatives under a high temperature decomposes to produce gas-phase iron atoms that reacts with oxygen to generate $FeO_2$; $FeO_2$ can capture oxygen radicals during a chain combustion reaction to generate FeO; FeO, which is an unstable active substance, enters a catalytic circulation of hydrogen atom recombination together with $Fe(OH)_2$ and FeOH; $Fe(OH)_2$ can capture hydrogen radicals during the chain combustion reaction to generate FeOH; FeOH can continue to consume hydrogen radicals during the chain combustion reaction to generate FeO, thereby forming a circulation that FeO consumes hydrogen radicals to block the chain combustion reaction.

$$FeOH + H. \rightleftharpoons FeO + H_2$$

$$FeO + H_2O \rightleftharpoons Fe(OH)_2$$

$$Fe(OH)_2 + H. \rightleftharpoons FeOH + H_2O$$

While a large number of radicals block the chain combustion reaction, the iron particles or other active particles released during the decomposition process have synergistic effect with the fire extinguishing substance released from pyrotechnic agents and auxiliary components of the fire extinguishing composition, so that the extinguishing efficiency of fire extinguishing agent is further enhanced and the effective fire extinguishing time is greatly reduced.

In order to achieve good extinguishing effect, the content of ferrocene or a derivative thereof contained in the ferrocene-based fire extinguishing composition of the present invention is at least 25 mass %, preferably 40 mass % or more. Although the object of the present invention can still be achieved when the content of ferrocene or the derivative thereof is 100 mass %, when this content reaches a certain level, the extinguishing effect of ferrocene or the derivative thereof will not considerably changes along with an increase of their content. From this viewpoint, it is preferable that the content of ferrocene or the derivative thereof is 80 mass % or less.

In order to ensure that the fire extinguishing composition has a stable performance under normal temperature condition and can be conveniently stored for a long term, the derivative of ferrocene preferably has a melting point of 100° C. or higher. Besides, a volatile ferrocene derivative is further preferable so that the fire extinguishing composition being heated can rapidly decompose, volatilize and release a large quantity of fire extinguishing substance and quickly take away the heat generated by the combustion of fire extinguishing agent.

Ferrocene derivatives used in the present invention can be ferrocene aldehydes or ketones, such as 1,2-diformyl ferrocene, 3-ferrocenyl acrylaldehyde, (4-formylphenyl) ferrocene, octamethylformylferrocene, chloroacetyl ferrocene, 1-acetyl-1'-cyano ferrocene, α-oxo-1,1'-trimethylene ferrocene, β-oxo-1,1'-tetramethylene ferrocene, 1,1'-diacetyl ferrocene, (1,3-dioxobutyl)ferrocene, 1-acetyl-1'-acetylamino ferrocene, (2-chlorobenzoyl)ferrocene, benzoyl ferrocene, 1,1'-di(3-cyano-propionyl)ferrocene, phenylacetyl ferrocene, (2-methoxybenzoyl)ferrocene, 1,1'-di(acetoacetyl)ferrocene, 1-acetyl-1'-p-chlorobenzoyl ferrocene, 1-ferrocenyl-3-phenyl-2-propen-1-one, 3-ferrocenyl-1-phenyl-2-propen-1-one, (2,4-dimethoxy benzoyl)ferrocene, 1,1'-di(propionoacetyl)ferrocene, bisferrocenyl methyl ketone, 2-acetyl-biferrocene, 1,1'-di(pentafluorobenzoyl)ferrocene, 1,2-bisferrocenyl acyl ethane, 1,3-bis(ferrocenyl methylidene)acetone, 1'-acetyl-2,2-bisferrocenyl propane, 1,1'-di(benzoyl acetyl)ferrocene.

Ferrocene derivatives used in the present invention can also be compounds of ferrocene carboxylic acid and its derivatives, such as ferrocene carboxylic acid, 2-hydroxy ferrocene carboxylic acid, ferrocene acetic acid, ferrocene thioacetic acid, 3-ferrocenyl acrylic acid, ferrocene propionic acid, ferrocene methylthio acetic acid, 1,1'-ferrocene diacetic acid, ferrocene butyric acid, ferrocene pentanoic acid, 2,2-dimethyl-3-ferrocenyl propionic acid, 1,1'-ferrocene dipropionic acid, ferrocene hexanoic acid, 1,1'-ferrocene dibutyric acid, 4,4'-bisferrocenyl pentanoic acid, 1,1'-ferrocene diformyl chloride, 1,2-ferrocene dicarboxylic anhydride, 1,1'-ferrocene diacetic anhydride, 2-(1'-carboxymethyl ferrocene) benzoic anhydride, ferrocene formic anhydride, dimethyl ferrocene-1,1'-dicarboxylate, 3-ferrocenyl ethyl acrylate, 1,1'''-di(methoxycarbonyl)-biferrocene, 4,4'-bisferrocenyl methyl pentanoate, ferrocene formamide, ferrocene formyl hydroxylamine, ferrocene formyl hydrazide, acetamido ferrocene, ferrocene formyl azirdine, 1'-vinyl ferrocene formamide, N-(2-cyanoethyl) ferrocene formamide, N-acetyl-2-ferrocenyl ethylamine, N-butyl ferrocene formamide, 1,1'-ferrocene diformyl azirdine, N,N,N',N'-tetramethyl-1,1'-ferrocene diformamide, N-phenyl ferrocene formyl hydroxylamine, N-ferrocenyl phthalimide, N-benzoyl-2-ferrocenyl ethylamine, 4,4-bisferrocenyl valeramide, cyano ferrocene, 1,1'-dicyano ferrocene.

Ferrocene derivatives used in the present invention can also be compounds of ferrocene alcohols, phenols or ethers, such as α-hydroxy ferrocene acetonitrile, ferrocene dimethanol, 1,2-ferrocene dimethanol, 1,1'-di(1-ethoxyl)ferrocene, octamethyl ferrocene methanol, ferrocenyl-(2,4,6-trimethoxyphenyl)methanol, bisferrocenyl methanol, α,α-diphenyl ferrocene methanol, 4-(2-ferrocenyl-2-ethoxyl)-4-methyl-2,2'-bipyridine, 2-methyl-α,α-diphenyl ferrocene methanol, 1,4-bisferrocenyl-1,4-butanediol, 4,4-bisferrocenyl-1-pentanol, 4,4'-di(2-ferrocenyl-2-ethoxyl)-2,2-bipyridine, 1,1'-di(diphenylhydroxymethyl)ferrocene, (4-hydroxyphenyl) ferrocene, 2-oxa-1,1'-trimethylene ferrocene, 1,3-dimethyl-2-oxa-1,1'-trimethylene ferrocene, bis(ferrocenyl methyl)ether, 1,1-bisferrocenyl methyl tert-butyl ether.

Ferrocene derivatives used in the present invention can also be ferrocene hydrocarbon compounds, such as 1,1'-trimethylene ferrocene, 1,1'-diethyl ferrocene, 1-vinyl-1'-chloroferrocene, 1,1'-di(α-cyclopentadienyl ethylidene)ferrocene, phenylethynyl ferrocene, bisferrocenyl acetylene, 1,1'-di(phenylethynyl)ferrocene, 1,1'-bis(ferrocenyl ethynyl) ferrocene, 1,1',2,2'-tetrachloro ferrocene, fluoroferrocene, biferrocene, 2,2-bisferrocenyl propane, 1,1-bisferrocenyl pentane, 1',1'''-di(triphenyl methyl)biferrocene.

Ferrocene derivatives used in the present invention can also be nitrogen-containing ferrocene compounds such as (2-nitrovinyl)ferrocene, (4-nitrophenyl)ferrocene, 2-hydroxy-2-ferrocenyl ethylamine, N,N'-bisferrocenyl ethylenediamine, N,N'-bisferrocenyl methyl ethylenediamine, N,N'-di(bisferrocenyl methyl)ethylenediamine, 2-hydroxy-5-nitrobenzylimino ferrocene, benzoyl ferrocene oxime, ferrocene methyl diazomethyl ketone, 1,1'-diphenyl azoferrocene, ferrocenyl phenyl methylimino benzene, 1,6-diferrocenyl-2,5-diaza-1,5-hexadiene.

Ferrocene derivatives used in the present invention can also be sulfur-containing or phosphorus-containing ferrocene compounds, such as 1,1'-ferrocene disulfonyl chloride, 1,1'-ferrocene disulfonyl azide, ferrocene sulfonyl chloride, ferrocene sulfinic acid, ferrocene sulfonic acid, (diethyl-dithiocarbamate)-ferrocene, 1,1'-di(dimethyl-dithiocarbamate)-ferrocene, ferrocene methyl phenyl sulfone, thiolferrocenyl-ferrocene sulphonate, bisferrocenyl disulfide, N,N'-dicyclohexyl-1,1'-disulfonamide ferrocene, (diphenylphosphino)-ferrocene; and silicon-containing ferrocene compounds such as 1,1'-dichloro-2-trichlorosilanyl-ferrocene, bis(1,1'-dichloro-2,2'-ferrocenylene)-silane, (1,1'-octamethyl-ferrocenylene)-dimethylsilane, (1,1'-dichloro-2,2'-ferrocenylene)-diphenylsilane, 1,1'-di[α-hydroxy-α-(trisilylpropyl)ethyl]ferrocene, 1,1'-di(phthalimide methyldisilyl)ferrocene.

Ferrocene derivatives used in the present invention can also be heterocyclic ferrocene compounds such as 2-ferrocenyl-1,3-dithiane, 5-ferrocenyl-methylidene-1-aza-3-oxa-4-oxo-2-phenyl-1-cyclopentene, 1,3-bisferrocenyl imidazoline, 2,5-bisferrocenyl tetrahydrofuran.

Ferrocene derivatives used in the present invention can also be, for example, 1,1'-dicopper ferrocene, chloromercury ferrocene, ferrocene boric acid, ferrocenyl cuprous acetylide, bisferrocenyl titanocene.

For persons skilled in the art, it should be understood that the present invention aims to find a novel main fire extinguishing material and its content in the fire extinguishing composition, which can be used by those skilled in the art optionally in combination with cooperation substances commonly used in the art such as flame retardants, additives or other fire extinguishing substance, etc., provided that the fire extinguishing composition is not prejudiced. The addition of these coordination substances aims to prevent the main fire extinguishing material from combusting before reaching the flame and therefore losing fire extinguishing capability.

The flame retardants that can be preferably used in the present invention are compounds which has a decompose temperature of 100° C. or higher, are apt to decompose under heat, and can release gas, liquid or solid particles, or compounds whose thermal decomposition products have a flame retardant effect. Specifically, as the flame retardants can be mentioned brominated flame retardants such as tetrabromobisphenol A, tetrabromobisphenol A ether, 1,2-bis(tribromophenoxy)ethane, 2,4,6-tribromophenyl glycidyl ether, tetrabromo phthalic anhydride, 1,2-bis(tetrabromo phthalimide) ethane, tetrabromo dimethyl phthalate, tetrabromo disodium phthalate, decabromodiphenyl ether, tetradecabromodi(phenoxyl)benzene, 1,2-bis(pentabromophenyl)ethane, bromo-trimethyl-phenyl-hydroindene, pentabromobenzyl acrylate, pentabromobenzyl bromide, hexabromobenzene, pentabromotoluene, 2,4,6-tribromophenyl maleimide, hexabromo cyclododecane, N,N'-1,2-bis(dibromonorbornyl dicarbimide) ethane, pentabromochloro-cyclohexane, tri(2,3-dibromopropyl)isocyanurate, bromostyrene copolymer, tetrabromobisphenol A-carbonate oligomer, polypentabromobenzyl acrylate, polydibromophenylene ether; chlorinated flame retardants such as dechlorane plus, HET anhydride (chlorendic anhydride), perchloro pentacyclodecane, tetrachloro bisphenol A, tetrachlorophthalic anhydride, hexachlorobenzene, chlorinated polypropylene, chlorinated polyvinyl chloride, vinyl chloride-vinylidene chloride copolymer, chlorinated polyether, hexachloroethane; organic phosphorus flame retardants such as 1-oxo-4-hydroxymethyl-2,6,7-trioxa-1-phosphabicyclo[2,2,2]octane, 2,2-dimethyl-1,3-propanediol-di(neopentyl glycol) diphosphate, 9,10-di hydro-9-oxa-10-phosphaphenanthrene-10 oxide, bis(4-carboxyphenyl)-phenyl phosphine oxide, bis(4-hydroxyphenyl)-phenyl phosphine oxide, phenyl (diphenyl sulfone) phosphate oligomer; phosphorus-halogenated flame retardants such as tris(2,2-di(bromomethyl)-3-bromopropyl)phosphate, tris (dibromophenyl)phosphate, 3,9-bis(tribromophenoxy)-2,4,8,10-tetraoxa-3,9-diphosphaspiro[5,5]-3,9-dioxo-undecane, 3,9-bis(pentabromophenoxy)-2,4,8,10-tetraoxa-3,9-diphosphaspiro[5,5]-3,9-dioxo-undecane, 1-oxo-4-tribromophenoxycarbonyl-2,6,7-trioxa-1-phosphabicyclo[2,2,2]octane, p-phenylene-tetrakis(2,4,6-tribromophenyl)-diphosphate, 2,2-di(chloromethyl)-1,3-propanediol-di(neopentyl glycol) diphosphate, 2,9-di(tribromo-neopentyloxy)-2,4,8,10-tetraoxa-3,9-diphosphaspiro[5,5]-3,9-dioxo-undecane; nitrogen-based flame retardants or phosphorus-nitrogen-based flame retardants such as melamine, melamine cyanurate, melamine orthophosphate, dimelamine orthophosphate, melamine polyphosphate, melamine borate, melamine octamolybdate, cyanuric acid, tris(hydroxyethyl)isocyanurate, 2,4-diamino-6-(3,3,3-trichloro-propyl)-1,3,5-triazine, 2,4-di(N-hydroxymethyl-amino)-6-(3,3,3-trichloro-propyl-1,3,5-triazine), diguanidine hydrophosphate, guanidine dihydrogen phosphate, guanidine carbonate, guanidine sulfamate, urea, urea dihydrogen phosphate, dicyandiamide, melamine bis(2,6,7-trioxa-phospha-bicyclo[2.2.2]octane-1-oxo-4-methyl)-hydroxy-phosphate, 3,9-dihydroxy-3,9-dioxo-2,4,8,10-tetraoxa-3,9-diphosphaspiro[5.5]undecane-3,9-dimelamine, 1,2-di(2-oxo-5,5-dimethyl-1,3-dioxa-2-phosphacyclohexyl-2-amino) ethane, N,N'-bis(2-oxo-5,5-dimethyl-1,3-dioxa-2-phosphacyclohexyl)-2,2'-m-phenylenediamine, tri(2-oxo-5,5-dimethyl-1,3-dioxa-2-phosphacyclohexyl-2-methyl)amine, hexachlorocyclotriphosphazene; and inorganic flame retardants such as red phosphorus, ammonium polyphosphate, diammonium hydrophosphate, ammonium dihydrogen phosphate, zinc phosphate, aluminum phosphate, boron phosphate, antimony trioxide, aluminum hydroxide, magnesium hydroxide, hydromagnesite, alkaline aluminum oxalate, zinc borate, barium metaborate, zinc oxide, zinc sulfide, zinc sulfate heptahydrate, aluminum borate whisker, ammonium octamolybdate, ammonium heptamolybdate, zinc stannate, stannous oxide, stannic oxide, ferrocenc, ferric acetone, ferric oxide, ferro-ferric oxide, ammonium bromide, sodium tungstate, potassium hexafluorotitanate, potassium hexafluorozirconate, titanium dioxide, calcium carbonate, barium sulfate.

The flame retardants used in the present invention can also be other chemical substances which has a decompose temperature of 100° C. or higher and can decompose out fire extinguishing substances, for example, sodium bicarbonate, potassium bicarbonate, cobalt carbonate, zinc carbonate, basic zinc carbonate, heavy magnesium carbonate, basic magnesium carbonate, manganese carbonate, ferrous carbonate, strontium carbonate, sodium potassium carbonate hexahydrate, magnesium carbonate, calcium carbonate, dolomite, basic copper carbonate, zirconium carbonate, beryllium carbonate, sodium sesquicarbonate, cerium carbonate, lanthanum carbonate, guanidine carbonate, lithium carbonate, scandium carbonate, vanadium carbonate, chromium carbonate, nickel carbonate, yttrium carbonate, silver carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, lutetium carbonate, aluminium diacetate, calcium acetate, sodium bitartrate, sodium acetate, potassium acetate, zinc acetate, strontium acetate, nickel acetate, copper acetate, sodium oxalate, potassium oxalate, ammonium oxalate, nickel oxalate, manganese oxalate dihydrate, iron nitride, sodium nitrate, magnesium nitrate, potassium nitrate, zirconium nitrate, calcium dihydrogen phosphate, sodium dihydrogen phosphate, sodium dihydrogen phosphate dihydrate, potassium dihydrogen phosphate, aluminum dihydrogen phosphate, ammonium dihydrogen phosphate, zinc dihydrogen phosphate, manganese dihydrogen phosphate, magnesium dihydrogen phosphate, disodium hydrogen phosphate, diammonium hydrogen phosphate, calcium hydrogen phosphate, magnesium hydrogen phosphate, ammonium phosphate, magnesium ammonium phosphate, ammonium polyphosphate, potassium metaphosphate, potassium tripolyphosphate, sodium trimetaphosphate, ammonium hypophosphite, ammonium dihydrogen phosphite, manganese phosphate, dizinc hydrogen phosphate, dimanganese hydrogen phosphate, guanidine phosphate, melamine phosphate, urea phosphate, strontium dimetaborate hydrogen phosphate, boric acid, ammonium pentaborate, potassium tetraborate octahydrate, magnesium metaborate octahydrate, ammonium tetraborate tetrahydrate, strontium metaborate, strontium tetraborate, strontium tetraborate tetrahydrate, sodium tetraborate decahydrate, manganese borate, zinc borate, ammonium fluoroborate, ammonium ferrous sulfate, aluminum sulfate, potassium aluminum sulfate, ammonium aluminum sulfate, ammonium sulfate, magnesium hydrogen sulfate, aluminum hydroxide, magnesium hydroxide, iron hydroxide, cobalt hydroxide, bismuth hydroxide, strontium hydroxide, cerium hydroxide, lanthanum hydroxide, molybdenum hydroxide, ammonium molybdate, zinc stannate, magnesium trisilicate, telluric acid, manganese tungstate, manganite, cobaltocene, 5-aminotetrazole, guanidine nitrate, azobisformamide, nylon powder, oxamide, biuret, pentaerythritol, decabromodiphenyl ether, tetrabromo-phthalic anhydride, dibromoneopentyl glycol, potassium citrate, sodium citrate, manganese citrate, magnesium citrate, copper citrate, ammonium citrate, nitroguanidine.

From the view of sufficiently exerting the extinguishing effect of ferrocene and its derivatives that act as the main extinguishing material, the content of the above-described flame retardant is not higher than 75 mass %, preferably 60 mass % or less, and further preferably 50 mass % or less and 20 mass % or more.

The ferrocene-based fire extinguishing composition of the present invention can also be added, as needed, with various additives such as a complex solution of stearate, graphite and water-soluble polymer, or a mixture thereof. The content of the additive is preferably from 0.5 to 10 mass %.

Each of preferred components of the ferrocene-based fire extinguishing composition of the present invention and its content are:

ferrocene, a ferrocene derivative, or a combination thereof: from 30 mass % to 80 mass % a flame retardant: from 20 mass % to 60 mass % an additive: from 5 mass % to 8 mass %.

Each of more preferred components of the ferrocene-based fire extinguishing composition of the present invention and its content are:

ferrocene, a ferrocene derivative, or a combination thereof: from 40 mass % to 70 mass % a flame retardant: from 30 mass % to 50 mass % an additive: from 5 mass % to 8 mass %.

The ferrocene-based fire extinguishing composition of the present invention can be molded by processes such as pelleting, molding, extrusion into bulk, sheet, sphere, strip and honeycomb, and may be subjected to a surface coating treatment. When the surface coating treatment is performed, hydroxypropyl methylcellulose or hydroxyethyl cellulose is preferably added as a surface coating agent. The surface coating agent can improve the surface finish of the composition system, and allows further improvement of the strength, abrasion resistance and vibration resistance, thereby preventing the coolant from chalking, slagging and spilling from the extinguisher during transport.

DESCRIPTION OF THE PREFERRED EMBODIMENTS

The ferrocene-based fire extinguishing composition of the present invention is described in more detail through examples below.

Example 1

Add 50 g of a prepared composition sample of ferrocene, ammonium dihydrogen phosphate and ammonium ferrous sulfate to a fire extinguishing device into which 50 g of K-type thermal aerosol generating agent is filled. Then, carry out a test of extinguishing petrol fire in an oil tray of 0.1 $m^2$. The test result is shown in Table 1.

Example 2

The prepared composition of ferrocene and ammonium polyphosphate is tested in accordance with Example 1. The test result is shown in Table 1.

Example 3

The prepared composition of ferrocene and zinc carbonate is tested in accordance with Example 1. The test result is shown in Table 1.

Example 4

The prepared composition of ferrocene, potassium chloride, zinc oxide, iron oxide and basic magnesium carbonate is tested in accordance with Example 1. The test result is shown in Table 1.

Example 5

The prepared composition of ferrocene, potassium chloride, zinc oxide, manganese carbonate and sodium silicate is tested in accordance with Example 1. The test result is shown in Table 1.

Example 6

The prepared composition of ferrocene, melamine and magnesium hydroxide is tested in accordance with Example 1. The test result is shown in Table 1.

Example 7

The prepared composition of ferrocene and ammonium oxalate is tested in accordance with Example 1. The test result is shown in Table 1.

Example 8

The prepared composition of styryl ferrocene, ammonium dihydrogen phosphate and ammonium ferrous sulfate is tested in accordance with Example 1. The test result is shown in Table 1.

Example 9

The prepared composition of biferrocene and ammonium polyphosphate is tested in accordance with Example 1. The test result is shown in Table 1.

Example 10

The prepared composition of ferrocene sulfonyl chloride, potassium chloride, zinc oxide, manganese carbonate, and sodium silicate is tested in accordance with Example 1. The test result is shown in Table 1.

Comparative Example 1

Carry out a test of extinguishing petrol fire in an oil tray of 0.1 $m^2$ by using a fire extinguishing device sample in which only 100 g of S-type thermal aerosol fire extinguishing agent is filled. The test result is shown in Table 1.

Comparative Example 2

Carry out a test of extinguishing petrol fire in an oil tray of 0.1 $m^2$ by using a fire extinguishing device sample in which only 100 g of K-type thermal aerosol fire extinguishing agent is filled. The test result is shown in Table 1.

Comparative Example 3

Prepare a fire extinguishing composition by merely adding manganese carbonate, which is a cooling and auxiliary extinguishing material, and magnesium stearate and hydroxypropyl methylcellulose as processing aids, without adding ferrocene as the main fire extinguishing substance. The prepared composition is tested in accordance with Example 1. The test result is shown in Table 1.

TABLE 1 comparison of ingredients of various components and contrast of test results

| | Content (percent by mass) of components in Examples | | | | | | | | | | Comparative Examples | | |
|---|---|---|---|---|---|---|---|---|---|---|---|---|---|
| Ingredients | 1 | 2 | 3 | 4 | 5 | 6 | 7 | 8 | 9 | 10 | 1 | 2 | 3 |
| Main fire extinguishing material | | | | | | | | | | | | | |
| S-type fire extinguishing agent | | | | | | | | | | | ✓ | | |
| K-type fire extinguishing agent | | | | | | | | | | | | ✓ | |
| Ferrocene | 63 | 37 | 47.5 | 40 | 30 | 35 | 70 | | | | | | |
| Styryl ferrocene | | | | | | | | 63 | | | | | |
| Biferrocene | | | | | | | | | 37 | | | | |
| Ferrocenesulfonyl chloride | | | | | | | | | | 30 | | | |
| Flame retardant | | | | | | | | | | | | | |
| Ammonium dihydrogen phosphate | 20 | | | | | | | 20 | | | | | |
| Ammonium polyphosphate | | 57 | | | | | | | 57 | | | | |
| Zinc carbonate | | | 47.5 | | | | | | | | | | |
| Ammonium ferrous sulfate | 15 | | | | | | | 15 | | | | | |
| Manganese carbonate | | | | | 6 | | | | | 6 | | | 97 |
| Melamine | | | | | | 30 | | | | | | | |
| Ammonium oxalate | | | | | | | 25 | | | | | | |
| Magnesium hydroxide | | | | | | 31 | | | | | | | |

TABLE 1-continued comparison of ingredients of various components and contrast of test results

| Ingredients | Content (percent by mass) of components in Examples | | | | | | | | | | Comparative Examples | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Potassium chloride | | | | 40 | 50 | | | | | 50 | | | |
| Basic magnesium carbonate | | | | 5 | | | | | | | | | |
| Zinc oxide | | | | 5 | 8 | | | | | 8 | | | |
| Iron oxide | | | | 5 | | | | | | | | | |
| Additives | | | | | | | | | | | | | |
| Magnesium stearate | 1 | 1.5 | 0.5 | | | | 0.5 | 1 | 1.5 | | | | |
| Zinc stearate | | | | 0.5 | | | | | | | | | |
| Graphite | | | | | 0.5 | 0.5 | | | | 0.5 | | | |
| hydroxypropyl methylcellulose | 1 | 4.5 | 4.5 | | | | 4.5 | 1 | 4.5 | | | | 2 |
| Sodium silicate | | | | 2.5 | 2.5 | | | | | 2.5 | | | |
| Polyvinyl alcohol | | | | 1 | 1 | 1 | | | | 1 | | | |
| Surface coating agent | | | | | | | | | | | | | |
| hydroxyethyl cellulose | | | | 1 | 2 | 2.5 | | | | 2 | | | 1 |
| Contrast of test results | | | | | | | | | | | | | |
| Temperature at nozzle of the generator (° C.) | 315 | 208 | 178 | 182 | 230 | 226 | 301 | 231 | 192 | 203 | 576 | 469 | 536 |
| *Extinguishment status | Y | Y | Y | Y | Y | Y | Y | Y | Y | Y | N | N | N |
| Time used for extinguishment (s) | 3.7 | 2.9 | 4.1 | 4.6 | 4.3 | 5.2 | 4.7 | 4.3 | 3.8 | 4.2 | | | |

*Notes: Y denotes that fire is extinguished. N denotes that fire is not extinguished.

The S, K-type extinguishing agents used in the Comparative Examples 1 and 2 in above table are commercially available. From Table 1, it is clear that the ferrocene-based fire extinguishing composition in Examples 1 to 10 of the present invention not only shows a fire extinguishing efficiency far superior to Comparative Examples 1 to 3 but also is obviously superior to Comparative Examples 1 to 3 in the time needed for the extinguishment and the temperature at the nozzle of the generator. Besides, the ferrocene-based fire extinguishing compositions used in Examples 4, 5, 6 and 10, in which a surface coating agent is added, realize significant improvement in strength, abrasion resistance and vibration resistance as compared with the other fire extinguishing compositions.

The above specific examples are merely exemplary, and various modifications and variations made by persons skilled in the art on the basis of the teaching by the examples of the present invention fall within the protection scope of the present invention. Those killed in the art should understand that the above specific description is only for the purpose of explaining the present invention and are not intended to limit the present invention in its scope.

The invention claimed is:

1. A ferrocene-based fire extinguishing composition, the fire extinguishing composition comprising: ferrocene, a ferrocene derivative, or a combination thereof at a content of 40 mass % or more; when in use, a pyrotechnic agent is used as a heat source and a power source, the pyrotechnic agent is ignited, and the high temperature generated by the combustion of the pyrotechnic agent is utilized to make a fire extinguishing composition produce a large amount of fire extinguishing substance, which is sprayed out together with the pyrotechnic agent, so as to achieve the purpose of extinguishing a fire.

2. The fire extinguishing composition according to claim 1, wherein the melting point of the ferrocene derivative is 100° C. or higher.

3. The fire extinguishing composition according to claim 2, wherein the ferrocene derivative is a volatile compound.

4. The fire extinguishing composition according to claim 1, wherein the pyrotechnic agent is a pyrotechnic aerosol fire extinguishing agent.

5. The fire extinguishing composition according to claim 1, wherein the ferrocene derivative is a compound of ferrocene aldehydes or ketones, or a compound of ferrocene carboxylic acid and its derivative, or a compound of ferrocene alcohols, phenols or ethers, or a ferrocene hydrocarbon compound, or a nitrogen-containing ferrocene compound, or a sulfur-containing or phosphorus-containing ferrocene compound, or a silicon-containing ferrocene compound, or a heterocyclic ferrocene compound.

6. The fire extinguishing composition according to claim 5, wherein the compound of ferrocene aldehydes or ketones is 1,2-diformyl ferrocene, 3-ferrocenyl acrylaldehyde, (4-formylphenyl) ferrocene, octamethylformyl ferrocene, chloroacetyl ferrocene, 1-acetyl-1'-cyano ferrocene, α-oxo-1,1'-trimethylene ferrocene, β-oxo-1,1'-tetramethylene ferrocene, 1,1'-diacetyl ferrocene, (1,3-dioxobutyl) ferrocene, 1-acetyl-1'-acetylamino ferrocene, (2-chlorobenzoyl) ferrocene, benzoyl ferrocene, 1,1'-di(3-cyano-propionyl) ferrocene, phenylacetyl ferrocene, (2-methoxybenzoyl) ferrocene, 1,1'-di(acetoacetyl) ferrocene, 1-acetyl-1'-p-chlorobenzoyl ferrocene, 1-ferrocenyl-3-phenyl-2-propen-1-one, 3-ferrocenyl-1-phenyl-2-propen-1-one, (2,4-dimethoxy benzoyl) ferrocene, 1,1'-di(propionoacetyl) ferrocene, bisferrocenyl methyl ketone, 2-acetyl-biferrocene, 1,1'-di(pentafluorobenzoyl) ferrocene, 1,2-bisferrocenyl acyl ethane, 1,3-bis(ferrocenyl methylidene) acetone, 1'-acetyl-2,2-bis-ferrocenyl propane, or 1,1'-di(benzoylacetyl) ferrocene.

7. The fire extinguishing composition according to claim 5, wherein the compound of ferrocene carboxylic acid and its derivative are ferrocene carboxylic acid, 2-hydroxy ferrocene carboxylic acid, ferrocene acetic acid, ferrocene thioacetic acid, 3-ferrocenyl acrylic acid, ferrocene propionic acid, ferrocene methylthio acetic acid, 1,1'-ferrocene diacetic acid, ferrocene butyric acid, ferrocene pentanoic acid, 2,2-dimethyl-3-ferrocenyl propionic acid, 1,1'-ferrocene dipropionic acid, ferrocene hexanoic acid, 1,1'-ferrocene dibutyric acid, 4,4'-bisferrocenyl pentanoic acid, 1,1'-ferrocene diformyl chloride, 1,2-ferrocene dicarboxylic anhydride, 1,1'-ferrocene diacetic anhydride, 2-(1'-carboxymethyl ferrocene) benzoic anhydride, ferrocene formic anhydride, dimethyl ferrocene-1,1'-dicarboxylate, 3-ferrocenyl ethyl acrylate, 1,1"-di(methoxycarbonyl)-biferrocene, 4,4-bisferrocenyl methyl pentanoate, ferrocene formamide, ferrocene formyl hydroxylamine, ferrocene formyl hydrazide, acetamido ferrocene, ferrocene formyl azirdine, 1'-vinyl ferrocene formamide, N-(2-cyanoethyl) ferrocene formamide, N-acetyl-2-ferrocenyl ethylamine, N-butyl ferrocene formamide, 1,1'-ferrocene diformyl azirdine, N,N,N,N'-tetramethyl-1,1'-ferrocene diformamide, N-phenyl ferrocene formyl hydroxylamine, N-ferrocenyl phthalimide, N-benzoyl-2-ferrocenyl ethylamine, 4,4-bisferrocenyl valeramide, cyano ferrocene, or 1,1'-dicyano ferrocene.

8. The fire extinguishing composition according to claim 5, wherein the compound of ferrocene alcohols, phenols, or ethers is α-hydroxy ferrocene acetonitrile, ferrocene dimethanol, 1,2-ferrocene dimethanol, 1,1'-di(1-ethoxyl) ferrocene, octamethyl ferrocene methanol, ferrocenyl-(2,4,6-trimethoxyphenyl)methanol, bisferrocenyl methanol, α,α-diphenyl ferrocene methanol, 4-(2-ferrocenyl-2-ethoxyl)-4'-methyl-2,2'-bipyridine, 2-methyl-α,α-diphenyl ferrocene methanol, 1,4-bisferrocenyl-1,4-butanediol, 4,4-bisferrocenyl-1-pentanol, 4,4'-di(2-ferrocenyl-2-ethoxyl)-2,2'-bipyridine, 1,1'-di(diphenylhydroxymethyl) ferrocene, (4-hydroxyphenyl) ferrocene, 2-oxa-1,1'-trimethylene ferrocene, 1,3-dimethyl-2-oxa-1,1'-trimethylene ferrocene, bis(ferrocenyl methyl)ether, or 1,1-bisferrocenyl methyl tert-butyl ether.

9. The fire extinguishing composition according to claim 5, wherein the ferrocene hydrocarbon compound is 1,1'-trimethylene ferrocene, 1,1'-diethyl ferrocene, 1-vinyl-1'-chloroferrocene, 1,1'-di(α-cyclopentadienyl ethylidene) ferrocene, phenylethynyl ferrocene, bisferrocenyl acetylene, 1,1'-di (phenylethynyl) ferrocene, 1,1'-bis(ferrocenyl ethynyl) ferrocene, 1,1',2,2'-tetrachloro ferrocene, fluoroferrocene, biferrocene, 2,2-bisferrocenyl propane, 1,1-bisferrocenyl pentane, or 1',1'''-di(triphenyl methyl) biferrocene.

10. The fire extinguishing composition according to claim 5, wherein the nitrogen-containing ferrocene compound is (2-nitrovinyl) ferrocene, (4-nitrophenyl) ferrocene, 2-hydroxy-2-ferrocenyl ethylamine, N,N'-bisferrocenyl ethylenediamine, N,N'-bisferrocenyl methyl ethylenediamine, N,N'-di(bisferrocenyl methyl)ethylenediamine, 2-hydroxy-5-nitrobenzylimino ferrocene, benzoyl ferrocene oxime, ferrocene methyl diazomethyl ketone, 1,1'-diphenyl azoferrocene, ferrocenyl phenyl methylimino benzene, or 1,6-diferrocenyl-2,5-diaza-1,5-hexadiene.

11. The fire extinguishing composition according to claim 5, wherein the sulfur-containing or phosphorus-containing ferrocene compound is 1,1'-ferrocene disulfonyl chloride, 1,1'-ferrocene disulfonyl azide, ferrocene sulfonyl chloride, ferrocene sulfinic acid, ferrocene sulfonic acid, (diethyl-dithiocarbamate)-ferrocene, 1,1'-di(dimethyl-dithiocarbamate)-ferrocene, ferrocene methyl phenyl sulfone, thiolferrocenyl-ferrocene sulphonate, bisferrocenyl disulfide, N,N'-dicyclohexyl-1,1'-disulfonamide ferrocene, or (diphenylphosphino)-ferrocene.

12. The fire extinguishing composition according to claim 5, wherein the silicon-containing ferrocene compound is 1,1'-dichloro-2-trichlorosilanyl-ferrocene, bis(1,1'-dichloro-2,2'-ferrocenylene)-silane, (1,1'-octamethyl-ferrocenylene)-dimethylsilane, (1,1'-dichloro-2,2'-ferrocenylene)-diphenylsilane, 1,1'-di[α-hydroxy-α-(trisilylpropyl)ethyl] ferrocene, or 1,1'-di(phthalimide methyldisilyl)ferrocene.

13. The fire extinguishing composition according to claim 5, wherein the heterocyclic ferrocene compound is 2-ferrocenyl-1,3-dithiane, 5-ferrocenyl-methylidene-1-aza-3-oxa-4-oxo-2-phenyl-1-cyclopentene, 1,3-bisferrocenyl imidazoline, or 2,5-bisferrocenyl tetrahydrofuran.

14. The fire extinguishing composition according to claim 1, wherein the ferrocene derivative can also be 1,1'-dicopper ferrocene, chloromercury ferrocene, ferrocene boric acid, ferrocenyl cuprous acetylide, or bisferrocenyl titanocene.

15. The fire extinguishing composition according to claim 1, wherein the composition further comprises a flame retardant, the flame retardant is a brominated flame retardant, a chlorinated flame retardant, an organic phosphorus flame retardant, a phosphorus-halogenated flame retardant, a nitrogen-based flame retardant or phosphorus-nitrogen-based flame retardant, or an inorganic flame retardant.

16. The fire extinguishing composition according to claim 15, wherein the content of the flame retardant is not higher than 75 mass %.

17. The fire extinguishing composition according to claim 5, wherein the composition further comprises a flame retardant, the flame retardant is a brominated flame retardant, a chlorinated flame retardant, an organic phosphorus flame retardant, a phosphorus-halogenated flame retardant, a nitrogen-based flame retardant or phosphorus-nitrogen-based flame retardant, or an inorganic flame retardant, and the content of the flame retardant is not higher than 75 mass %.

18. The fire extinguishing composition according to claim 17, wherein the brominated flame retardant is tetrabromobisphenol A, tetrabromobisphenol A ether, 1,2-bis(tribromophenoxy)ethane, 2,4,6-tribromophenyl glycidyl ether, tetrabromo phthalic anhydride, 1,2-bis(tetrabromo phthalimide) ethane, tetrabromo dimethyl phthalate, tetrabromo disodium phthalate, decabromodiphenyl ether, tetradecabromodi(phenoxyl)benzene, 1,2-bis(pentabromophenyl)ethane, bromo-trimethyl-phenyl-hydroindene, pentabromobenzyl acrylate, pentabromobenzyl bromide, hexabromobenzene, pentabromotoluene, 2,4,6-tribromophenyl maleimide, hexabromo cyclododecane, N,N'-1,2-bis(dibromonorbornyl dicarbimide) ethane, pentabromochloro-cyclohexane, tri(2,3-dibromopropyl) isocyanurate, bromostyrene copolymer, tetrabromobisphenol A-carbonate oligomer, polypentabromobenzyl acrylate, or polydibromophenylene ether.

19. The fire extinguishing composition according to claim 17, wherein the chlorinated flame retardant is dechlorane plus, HET anhydride (chlorendic anhydride), perchloro pentacyclodecane, tetrachlorobisphenol A, tetrachlorophthalic anhydride, hexachlorobenzene, chlorinated polypropylene, chlorinated polyvinyl chloride, vinyl chloride-vinylidene chloride copolymer, chlorinated polyether, or hexachloroethane.

20. The fire extinguishing composition according to claim 17, wherein the organic phosphorus flame retardant is 1-oxo-4-hydroxymethyl-2,6,7-trioxa-1-phosphabicyclo[2,2,2] octane, 2,2-dimethyl-1,3-propanediol-di(neopentyl glycol) diphosphate, 9,10-dihydro-9-oxa-10-phosphaphenanthrene-10 oxide, bis(4-carboxyphenyl)-phenyl phosphine oxide, bis (4-hydroxyphenyl)-phenyl phosphine oxide, or phenyl (diphenyl sulfone) phosphate oligomer.

21. The fire extinguishing composition according to claim 17, wherein the phosphorus-halogenated flame retardant is tris(2,2-di(bromomethyl)-3-bromopropyl) phosphate, tris (dibromophenyl) phosphate, 3,9-bis(tribromophenoxy)-2,4,8,10-tetraoxa-3,9-diphosphaspiro[5,5]-3,9-dioxo-undecane, 3,9-bis(pentabromophenoxy)-2,4,8,10-tetraoxa-3,9-diphosphaspiro[5,5]-3,9-dioxo-undecane, 1-oxo-4-tribromophenoxycarbonyl-2,6,7-trioxa-1-phosphabicyclo[2,2,2] octane, p-phenylene-tetrakis(2,4,6-tribromophenyl)-diphosphate, 2,2-di(chloromethyl)-1,3-propanediol-di(neopentyl glycol) diphosphate, or 2,9-di(tribromoneopentyloxy)-2,4,8,10-tetraoxa-3,9-diphosphaspiro[5,5]-3,9-dioxo-undecane.

22. The fire extinguishing composition according to claim 17, wherein the nitrogen-based flame retardant or phosphorus-nitrogen-based flame retardant is melamine, melamine cyanurate, melamine orthophosphate, dimelamine orthophosphate, melamine polyphosphate, melamine borate, melamine octamolybdate, cyanuric acid, tris(hydroxyethyl) isocyanurate, 2,4-diamino-6-(3,3,3-trichloropropyl)-1,3,5-triazine, 2,4-di(N-hydroxymethyl-amino)-6-(3,3,3-trichloropropyl-1,3,5-triazine), diguanidine hydrophosphate, guanidine dihydrogen phosphate, guanidine carbonate, guanidine sulfamate, urea, urea dihydrogen phosphate, dicyandiamide, melamine bis (2,6,7-trioxa-1-phospha-bicyclo[2.2.2] octane-1-oxo-4-methyl)-hydroxyphosphate, 3,9-dihydroxy-3,9-dioxo-2,4,8,10-tetraoxa-3,9-diphosphaspiro [5.5] undecane-3,9-dimelamine, 1,2-di(2-oxo-5,5-dimethyl-1,3-dioxa-2-phosphacyclohexyl-2-amino) ethane, N,N'-bis (2-oxo-5,5-dimethyl-1,3-dioxa-2-phosphacyclohexyl)-2,2'-m-phenylenediamine, tri(2-oxo-5,5-dimethyl-1,3-dioxa-2-phosphacyclohexyl-2-methyl) amine, or hexachlorocyclotriphosphazene.

23. The fire extinguishing composition according to claim 17, wherein the inorganic flame retardant is red phosphorus, ammonium polyphosphate, diammonium hydrophosphate, ammonium dihydrogen phosphate, zinc phosphate, aluminum phosphate, boron phosphate, antimony trioxide, aluminum hydroxide, magnesium hydroxide, hydromagnesite, alkaline aluminum oxalate, zinc borate, barium metaborate, zinc oxide, zinc sulfide, zinc sulfate heptahydrate, aluminum borate whisker, ammonium octamolybdate, ammonium heptamolybdate, zinc stannate, stannous oxide, stannic oxide, ferrocene, ferric acetone, ferric oxide, ferro-ferric oxide, ammonium bromide, sodium tungstate, potassium hexafluorotitanate, potassium hexafluorozirconate, titanium dioxide, calcium carbonate, or barium sulfate.

24. The fire extinguishing composition according to claim 1, wherein the composition further comprises an additive, and the content of the additive is about 0.5 to 10 mass %.

25. The fire extinguishing composition according to claim 17, wherein the composition further comprises an additive, and the content of the additive is about 0.5 to 10 mass %.

26. The fire extinguishing composition according to claim 24, wherein the additive is a complex solution of stearate, graphite and water-soluble polymer, or a mixture thereof.

27. The fire extinguishing composition according to claim 25, wherein each of components of the composition and its content are:

ferrocene, a ferrocene derivative, or a combination thereof: from 40 mass % to 80 mass % a flame retardant: from 20 mass % to 60 mass % an additive: from 5 mass % to 8 mass %.

28. The fire extinguishing composition according to claim 24, wherein each of components of the composition and its content are:

ferrocene, a ferrocene derivative, or a combination thereof: from 40 mass % to 70 mass % a flame retardant: from 30 mass % to 50 mass % an additive: from 5 mass % to 8 mass %.

29. The fire extinguishing composition according to claim 1, wherein the composition is subjected to a surface coating treatment.

* * * * *